(12) United States Patent
Kümmel et al.

(10) Patent No.: US 12,668,136 B2
(45) Date of Patent: Jun. 30, 2026

(54) CROSS BEAM, MOTOR VEHICLE AND METHOD OF MOUNTING AN ASSEMBLY

(71) Applicant: MAN Truck & Bus SE, Munich (DE)

(72) Inventors: Daniel Kümmel, Munich (DE); Patrick Schwedes, Munich (DE); Darko Kondic, Munich (DE); Marcel Diemer, Munich (DE); Steve Sattler, Munich (DE); Willi Kusch, Wangen im Allgäu (DE)

(73) Assignee: MAN Truck & Bus SE, Munich (DE)

( * ) Notice: Subject to any disclaimer, the term of this patent is extended or adjusted under 35 U.S.C. 154(b) by 415 days.

(21) Appl. No.: 18/038,439

(22) PCT Filed: Oct. 6, 2021

(86) PCT No.: PCT/EP2021/077536
§ 371 (c)(1),
(2) Date: May 23, 2023

(87) PCT Pub. No.: WO2022/106111
PCT Pub. Date: May 27, 2022

(65) Prior Publication Data
US 2024/0010079 A1 Jan. 11, 2024

(30) Foreign Application Priority Data

Nov. 23, 2020 (DE) ..................... 10 2020 130 889.2

(51) Int. Cl.
*B60K 1/04* (2019.01)
*B60L 50/60* (2019.01)
(Continued)

(52) U.S. Cl.
CPC ............... *B60L 50/66* (2019.02); *B60K 1/04* (2013.01); *B62D 21/03* (2013.01); *B62D 21/11* (2013.01);
(Continued)

(58) Field of Classification Search
CPC ........ B60K 1/04; B60L 50/66; H01M 50/262; H01M 50/249; B62D 21/09; B62D 21/03
See application file for complete search history.

(56) References Cited

U.S. PATENT DOCUMENTS 11,038,236 B2 * 6/2021 Montgomery ...... H01M 50/244
11,059,361 B2 * 7/2021 Bohmer .................. B60L 50/64
(Continued)

FOREIGN PATENT DOCUMENTS

CN 110920372 A 3/2020
DE 4032823 A1 4/1992
(Continued)

OTHER PUBLICATIONS

German search report issued in German Patent Application No. DE102020130889.2 dated Jul. 14, 2021. English translation not available.
(Continued)

*Primary Examiner* — Jason D Shanske
*Assistant Examiner* — James J Triggs
(74) *Attorney, Agent, or Firm* — Weber Rosselli & Cannon LLP

(57) ABSTRACT

The invention relates, inter alia, to a cross beam (18) for a ladder frame (10) of a motor vehicle, preferably a utility vehicle. The cross beam (18) comprises an elongated support body (46) having an top side, a bottom side and at least one through hole (52, 54) connecting the top side and the bottom side. The cross beam (18) has at least one elastomeric bearing (48, 50) arranged in the at least one through hole (52, 54) and configured to elastically support an assembly (12), preferably comprising a traction battery, on the cross beam (18). The integration of the at least one elastomeric bearing (48, 50) into the at least one through hole (52,
(Continued)

Figure 1:
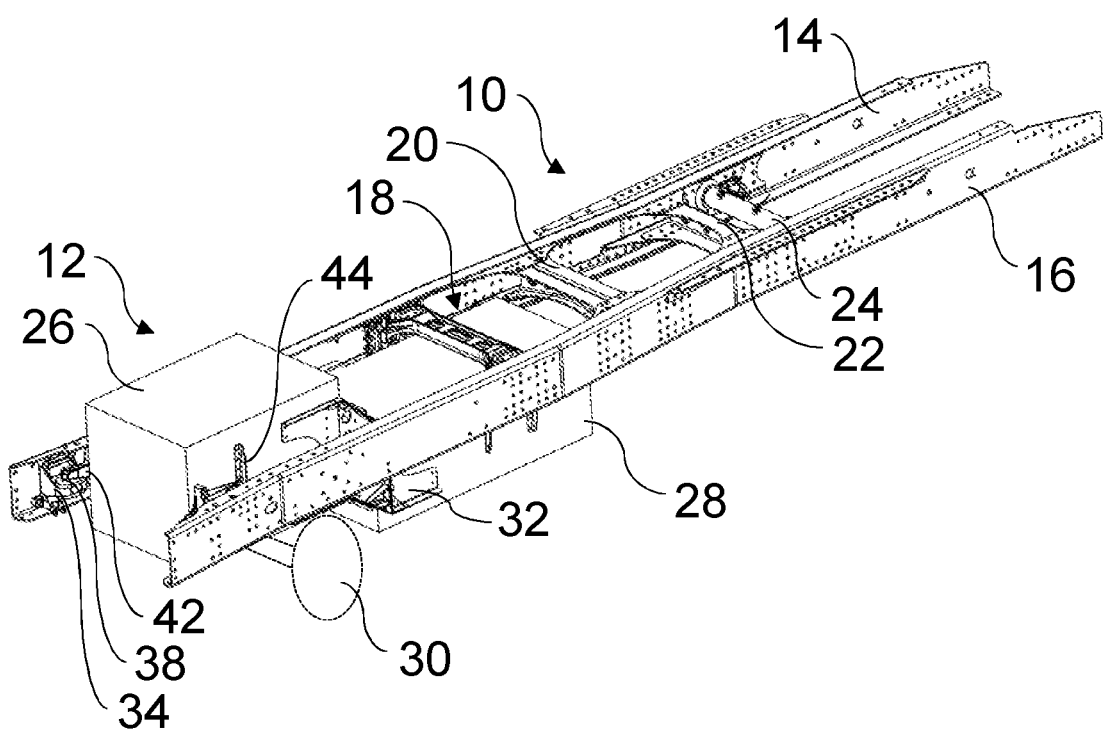

54) may allow a high connection stiffness around the at least one elastomeric bearing (48, 50).

19 Claims, 4 Drawing Sheets

(51) Int. Cl.

| | |
|---|---|
| *B62D 21/03* | (2006.01) |
| *B62D 21/11* | (2006.01) |
| *H01M 50/249* | (2021.01) |
| *H01M 50/262* | (2021.01) |

(52) U.S. Cl.
CPC ....... *H01M 50/249* (2021.01); *H01M 50/262* (2021.01); *B60K 2001/0438* (2013.01); *B60L 2200/18* (2013.01); *H01M 2220/20* (2013.01)

(56) References Cited

U.S. PATENT DOCUMENTS

| | | | |
|---|---|---|---|
| 2018/0013124 A1* | 1/2018 | Balaster | H01M 50/211 |
| 2018/0273088 A1 | 9/2018 | Offerle et al. | |
| 2020/0070639 A1 | 3/2020 | Bohmer et al. | |

FOREIGN PATENT DOCUMENTS

| | | | |
|---|---|---|---|
| DE | 10158107 | C1 | 2/2003 |
| DE | 102008020694 | A1 | 11/2009 |
| DE | 102013021009 | A1 | 6/2015 |
| DE | 102016113759 | A1 | 4/2017 |
| DE | 102015225282 | A1 | 6/2017 |
| DE | 102017006826 | A1 | 3/2018 |
| DE | 102017103663 | A1 | 8/2018 |
| EP | 0009975 | B1 | 10/1982 |
| EP | 3616954 | A1 | 3/2020 |
| EP | 3617039 | A1 | 3/2020 |

OTHER PUBLICATIONS

International Search Report issued in PCT Application No. PCT/EP2021/077536 dated Jan. 18, 2022 with English translation.
Brazilian Preliminary office action issued in Brazilian Application No. BR112023007973-0 dated Nov. 25, 2025 with English translation.
Chinese Office Action issued in Chinese Patent Application No. 202180078346.1 dated Dec. 9, 2025 With English translation.

\* cited by examiner

CROSS BEAM, MOTOR VEHICLE AND METHOD OF MOUNTING AN ASSEMBLY

CROSS-REFERENCE TO RELATED APPLICATIONS

This application is a 371 application of PCT/EP2021/077536 filed Oct. 6, 2021 which claims benefit of and priority to German Patent Application Serial No. DE102020130889.2 filed Nov. 23, 2020, the disclosures of the above-identified applications are hereby incorporated by reference in their entirety.

The invention relates to a cross beam for a ladder frame of a motor vehicle, preferably a utility vehicle. The invention further relates to a motor vehicle, preferably a utility vehicle. Furthermore, the invention relates to a method for mounting an assembly, preferably comprising a traction battery, to a ladder frame of a motor vehicle, preferably a utility vehicle.

Utility vehicles may have a ladder frame as a vehicle frame. The ladder frame has two parallel main longitudinal beams and a plurality of cross beams fastened between the main longitudinal beams. When assembling the utility vehicle, the ladder frame may be assembled first. Then, various assemblies can be attached to the ladder frame. In particular, the attachment of heavy assemblies to the cross beams or longitudinal members of the ladder frame can cause the entire ladder frame to warp undesirably or cause undesirable distortions at the bearing points of the assemblies. It may also be the case that the assembly of a large assembly to the ladder frame is made more difficult, since only limited assembly space is available due to the cross beams.

DE 10 2015 225 282 A1 discloses a device for fastening a drive unit. A first bearing and a second bearing are arranged spaced apart from each other in a transverse direction of the vehicle on a cross beam of a support structure to support the weight of a drive unit suspended from the support structure. The first bearing and the second bearing may be configured as elastomeric bearings.

EP 3 616 954 A1 discloses a truck comprising a rear axle, a ladder frame and an electric drive unit. A first cross beam and a second cross beam of the ladder frame have an inverted U-profile comprising a receiving space in which at least one bearing for supporting the electric drive unit is at least partially arranged. The electric drive unit is attached from below to the first cross beam and to the second cross beam.

The invention is based on the task of creating an improved technique for mounting an assembly, preferably a traction battery, on a ladder frame of a motor vehicle, in particular with regard to improved mountability.

The task is solved by the features of the independent claims. Advantageous further embodiments are indicated in the dependent claims and the description.

One aspect of the present disclosure relates to a cross beam for a ladder frame of a motor vehicle, preferably a utility vehicle (e.g. truck or bus). The cross beam comprises an elongated support body. The elongated support body has an top side and a bottom side. The elongated support body has at least one through hole connecting the top side and the bottom side. The cross beam further comprises at least one elastomeric bearing arranged in the at least one through hole and configured to elastically support an assembly, preferably comprising a traction battery, on the cross beam.

Advantageously, the integration of the at least one elastomeric bearing in the at least one through hole enables a high connection rigidity around the at least one elastomeric bearing (large surface contact), whereby, for example, even a very heavy assembly can be elastically supported. By means of the elastic mounting, sensitive components of the assembly can be decoupled from vibration influences from the chassis and deformations from the elasticity of the ladder frame. Advantageously, the integration of the at least one elastomeric bearing into the at least one through-hole of the support body can enable a relatively low-profile cross beam, so that even large assemblies can be elastically supported and suspended from the at least one elastomeric bearing of the cross beam. This can also enable new degrees of freedom in the assembly of very large aggregates, whereby the cross beam is, for example, first pre-mounted on the aggregate and then fastened to the ladder frame together with the aggregate.

In one embodiment, the at least one elastomeric bearing is pressed into the at least one through hole and is preferably additionally fastened to the elongated support body by means of a screw connection. Preferably, this enables a particularly durable and at the same time space-saving fastening of the elastomeric bearings. A high connection stiffness can be achieved by the press-fit.

For example, the at least one elastomeric bearing can have an elongated cross-section and two screw through-holes spaced apart from one another for fastening to the elongated support body. By means of cover plates covering the top and bottom of the at least one elastomeric bearing, the at least one elastomeric bearing may be positively fastened and force-locked in the at least one through hole.

In a further embodiment, the at least one through hole is configured as an elongated hole that is preferably aligned along a transverse axis of the elongated support body. Advantageously, the elongated hole can provide an enlarged installation space for the elastomeric bearing without having to enlarge the support body for this purpose. Thus, a relatively large elastomeric bearing can preferably be accommodated in the elongated hole, which ultimately also allows a relatively heavy assembly to be supported. Advantageously, the elongated hole can also increase the connection rigidity of the elastomeric bearing.

In a further embodiment, the elongated support body has a widened cross section and/or an increased wall thickness in the portion of the at least one through hole. Preferably, this makes it possible to improve load introduction via the elastomeric bearings into the elongated support body and thus also to support a relatively heavy assembly on the cross beam.

In a further embodiment, the elongated support body is configured as a solid body or with a closed profile. Advantageously, this can enable the elastomeric bearing to be held very securely in the elongated support body, in particular when it is pressed in.

For example, the at least one elastomeric bearing may have a (e.g., cylindrical) shell surface that is substantially fully supported in the at least one through hole.

It is possible for a cross-section of the at least one elastomeric bearing to substantially correspond to a cross-section of the at least one through-hole, preferably along an entire height of the at least one elastomeric bearing.

Preferably, the at least one elastomeric bearing may be received in the at least one through hole substantially along an entire height of the at least one elastomeric bearing.

It is also possible for a height of the at least one elastomeric bearing to be substantially equal to a length of the at least one through hole.

In one embodiment, the at least one through hole comprises a first through hole and a second through hole. The at least one elastomeric bearing comprises a first elastomeric bearing and a second elastomeric bearing. The first elastomeric bearing is arranged (and supported, for example, preferably fully circumferentially) in the first through-hole. The second elastomeric bearing is arranged in the second through hole (and, for example, supported, preferably fully circumferentially). Advantageously, this allows the assembly to be fastened to the two elastomeric bearings on two opposite longitudinal outer sides.

In a further embodiment, the first elastomeric bearing and the second elastomeric bearing are arranged at outermost opposite ends of the elongated support body. Advantageously, this allows the assembly to be supported on the elastomeric bearings at opposite longitudinal outer ends, while still allowing the assembly to be configured to be relatively wide. In addition, the loads caused by the assembly can be introduced into the main longitudinal beams of the ladder frame over a very short distance.

In another embodiment, the elongated support body extends from a first end portion through a middle portion to a second end portion (e.g., along a longitudinal axis of the support body). The middle portion has a smaller cross-section than the first end portion and the second end portion. The first through hole is arranged in the first end portion and the second through hole is arranged in the second end portion. Preferably, this allows for enlarged through holes, thereby allowing for larger elastomeric bearings, which in turn allow for the mounting of a relatively heavy assembly. The relatively heavy assembly typically requires a large installation space, which can be made possible by the arrangement of the elastomeric bearings in the end portions. Preferably, this even allows the opposite longitudinal outer sides of the assembly to be connected to the elastomeric bearings, while still allowing the assembly to be relatively wide.

Preferably, the middle portion, the first end portion and the second end portion together form a I-shape (I-with-serif-shape) in a plan view.

For example, the first end portion and the second end portion may each have a substantially trapezoidal cross-section (e.g., with the longer parallel leg of the two parallel legs of the trapezoidal shape facing outward), and/or the middle portion may have a bar shape or rod shape.

In another embodiment, the cross beam further comprises a first fastening bracket fastened at the end side to a first fastening section (e.g., of the first end portion) of the elongated support body and configured for fastening to a first main longitudinal beam of the ladder frame. Alternatively or additionally, the cross beam comprises a second fastening bracket, which is fastened at the end side and opposite to the first fastening bracket to a second fastening section (e.g. of the second end portion) of the elongated support body and is configured for fastening to a second main longitudinal beam of the ladder frame. Advantageously, this multipart design may allow for improved mounting of the cross beam to the main longitudinal beams. The fastening brackets of the cross beam can be pre-assembled on the main longitudinal beams. The support body can then be fastened to the fastening brackets, preferably already together with the assembly mounted thereon. When mounted in the ladder frame, the fastening brackets and the support body can together form the cross beam.

In a further embodiment, the elongated support body rests on the first fastening bracket of the cross beam and the second fastening bracket of the cross beam. Advantageously, it can thus be achieved that the support body can be configured to be very long, which can have an advantageous effect on the connection of the assembly at opposite ends of the support body and on the introduction of the loads caused by the assembly into the main longitudinal beams.

In one embodiment, the first fastening section is arranged with respect to a transverse axis of the support body on both sides of the first through-hole and/or the first elastomeric bearing, preferably overlappingly viewed in a direction of the transverse axis. Alternatively or additionally, the second fastening section may be arranged with respect to a transverse axis of the support body on both sides of the second through-hole and/or the second elastomeric bearing, preferably overlappingly viewed in a direction of the transverse axis. Preferably, this allows the elastomeric bearings to be placed very far outwardly of the elongated support body, which, as explained above, is advantageous for connecting a large, heavy assembly and may also improve force transmission into the main longitudinal beams.

Another aspect of the present disclosure relates to a motor vehicle, preferably a utility vehicle (e.g., truck or bus). The motor vehicle has a ladder frame with two parallel main longitudinal beams and a cross beam as disclosed herein, the cross beam being fastened between the two parallel main longitudinal beams. The motor vehicle further comprises an assembly elastically supported and suspended from the at least one elastomeric bearing of the cross beam. The motor vehicle may have the advantages already explained with respect to the cross beam with respect to assembly and mounting of the assembly.

In one embodiment, the assembly comprises a traction battery, power electronics, an air conditioning compressor, a cooling water pump and/or a high-voltage heater. Advantageously, the assembly can thus have a large number of sensitive components in an overall package, which can preferably be decoupled from vibration influences from the chassis and deformations from the elasticity of the lead frame by means of the cross beam.

In another embodiment, two opposite longitudinal outer sides of the assembly each have a fastening bracket, each fastening the assembly to one of the elastomeric bearings of the cross beam. It is thus not necessary to fasten the assembly to the cross beam (only) on one top side of the assembly. This can have an advantageous effect on the mounting of the assembly.

In a further embodiment, the assembly is additionally elastically supported on the two parallel main longitudinal beams, preferably resting on and/or forming an elastic 4-point support of the assembly on the ladder frame. Preferably, an elastic mounting suitable also for very heavy and large assemblies can thus be provided.

In a further embodiment, the assembly has a first assembly block and a second assembly block which are connected to one another in a step-like manner, the first assembly block being located higher than the second assembly block. The first assembly block (e.g. comprising a traction battery) is arranged above a front axle of the motor vehicle, and the second assembly block (e.g. comprising a traction battery) is arranged at least partially at the same level as the front axle. The stepped shape of the assembly can advantageously enable a very large and long assembly to span a front axle and be elastically supported on the ladder frame.

It is explicitly noted that the step-shaped design of the assembly is also disclosed herein as an independent aspect, that is, in particular, also disclosed independently of a configuration of the ladder frame and the cross beam. For example, this aspect may relate to a motor vehicle, preferably a utility vehicle (e.g., truck or bus), having an assembly comprising a first assembly block and a second assembly block connected to each other in a stepped configuration, wherein the first assembly block is located higher than the second assembly block. The first assembly block (e.g. comprising a traction battery) is arranged above a front axle of the motor vehicle, and the second assembly block (e.g. comprising a traction battery) is arranged at least partially on a level with the front axle.

Preferably, the first assembly block and the second assembly block can be connected by means of a connecting beam which, for example, has an H-shape in a plan view and/or to which the top sides and the longitudinal outer sides of the assembly blocks are fastened.

Preferably, the assembly blocks may each have a substantially cuboid shape.

Another aspect of the present disclosure relates to a method of mounting an assembly, preferably comprising a traction battery (and e.g., power electronics, an air conditioning compressor, a cooling water pump, and/or a high-voltage heater), to a ladder frame of a motor vehicle, preferably a utility vehicle (e.g., truck or bus). The method comprises providing a cross beam as disclosed herein. The method comprises pre-mounting the cross beam to the assembly by means of the at least one elastomeric bearing of the cross beam to form a pre-mounting unit, preferably with the cross beam above the assembly. The method further comprises mounting the pre-mounting unit to the ladder frame.

Advantageously, the method may lead to an improvement of the mounting process. In particular, the pre-mounting of the cross beam on the assembly can save an mounting step on the conveyor. Preferably, this can also prevent undesirable distortions of the elastomeric bearings during assembly, since frame tolerances and frame deformations of the ladder frame have no influence when fastening the assembly to the elastomeric bearings in the cross beam.

In one embodiment, the mounting comprises lowering the pre-mounting unit between two parallel main longitudinal beams of the ladder frame until the elongated support body of the cross beam rests on fastening brackets fastened internally to the two parallel main longitudinal beams, and fastening the elongated support body to the fastening brackets fastened internally to the two parallel main longitudinal beams.

Figure 2:
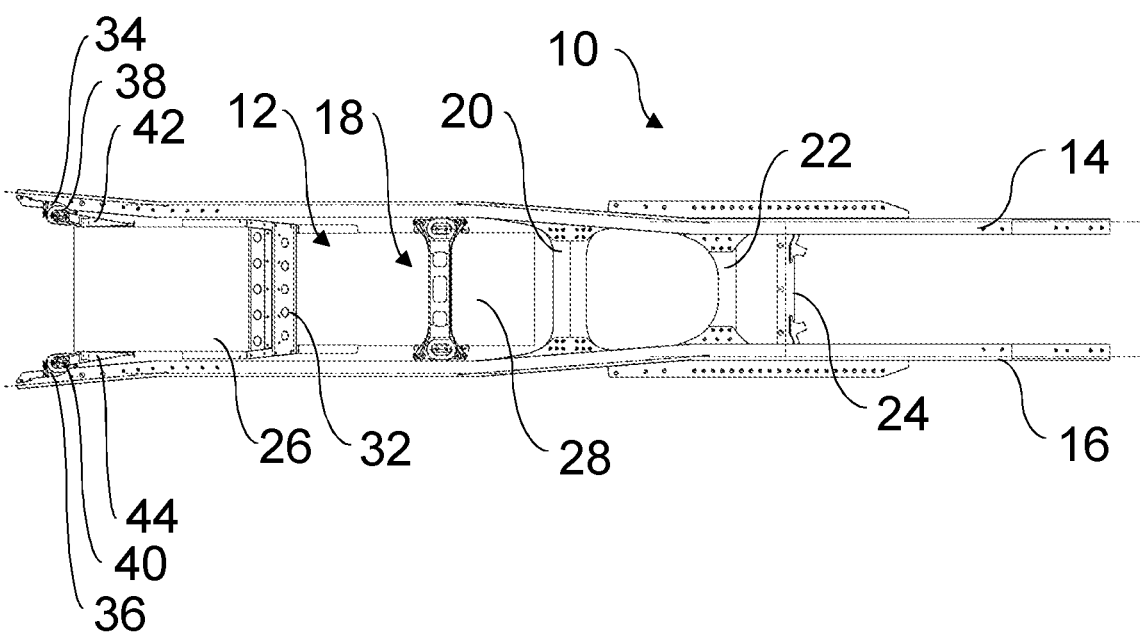
Figure 3:
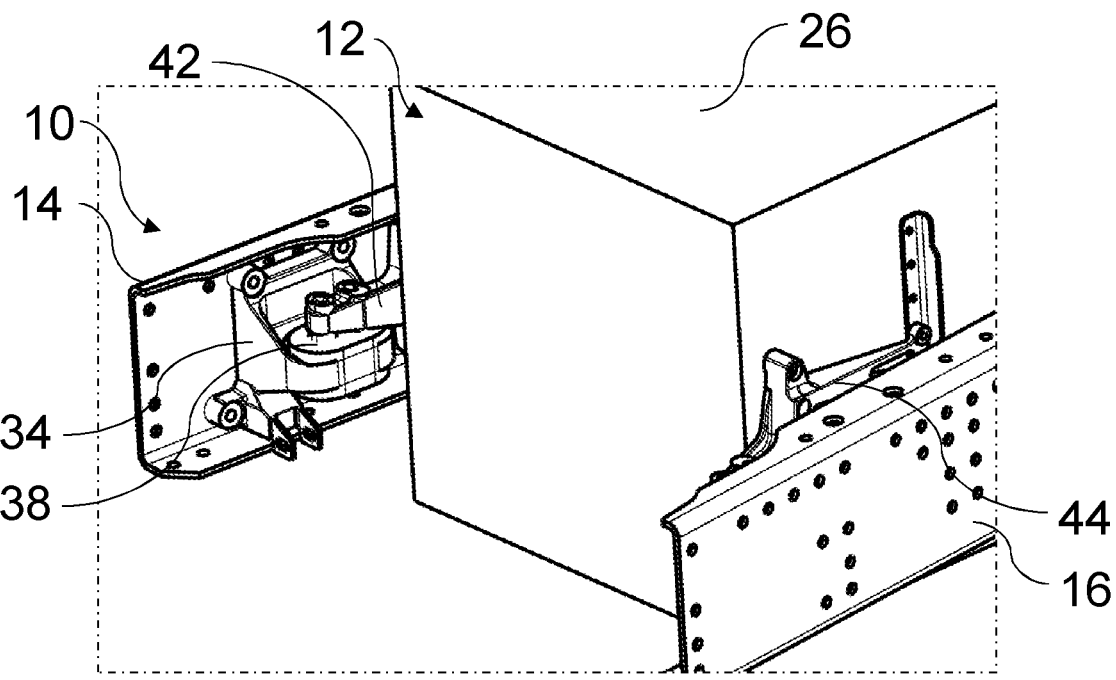
Figure 4:
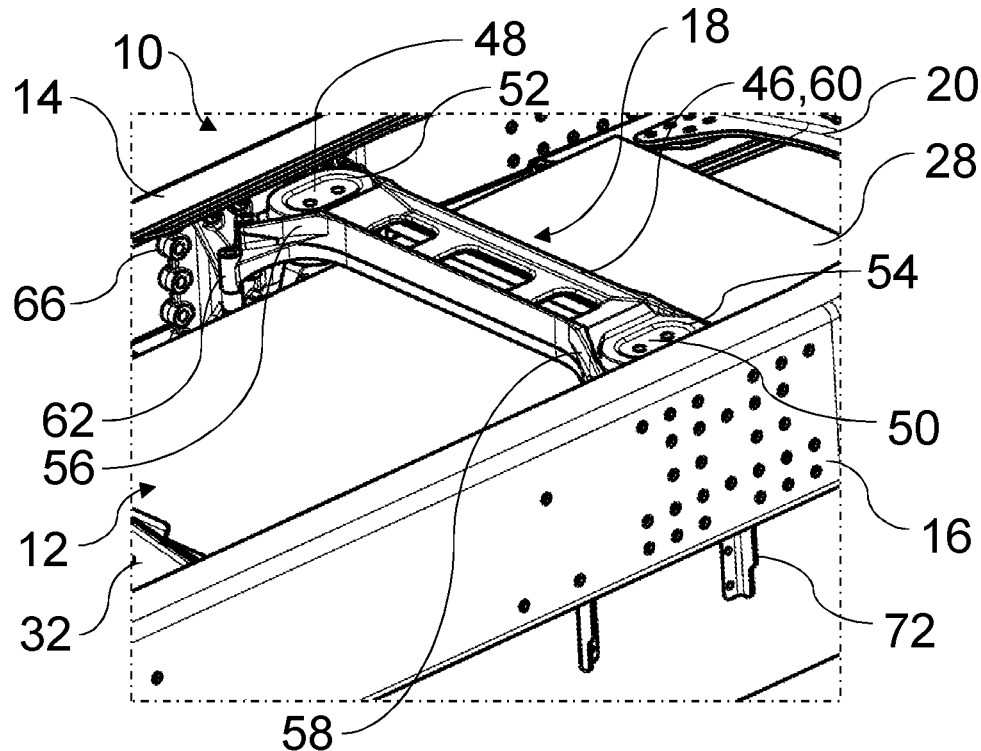
Figure 5:
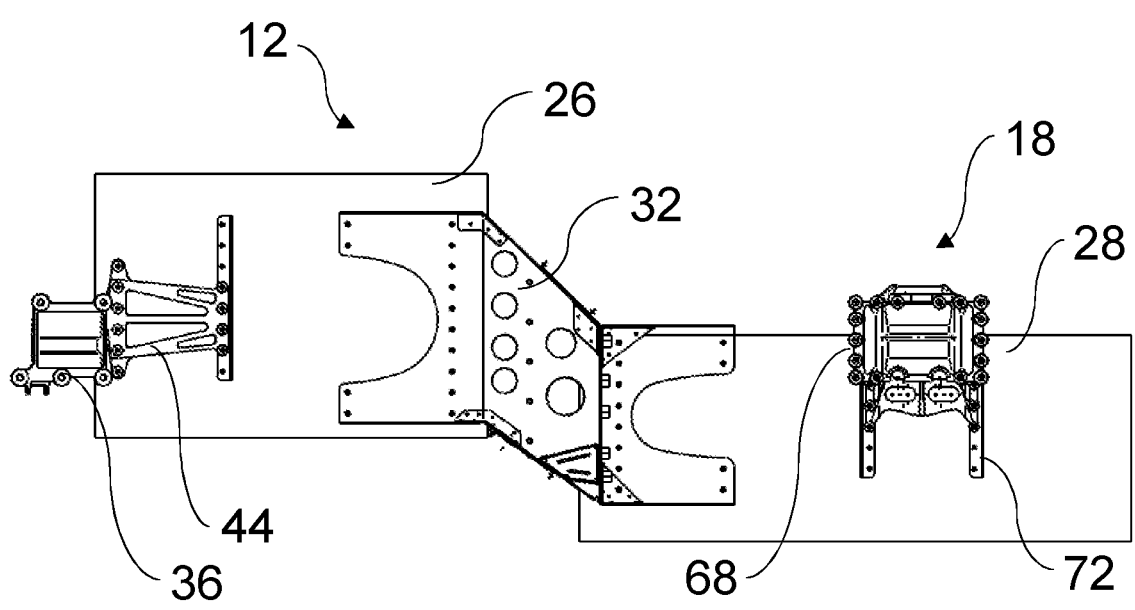
Figure 6:
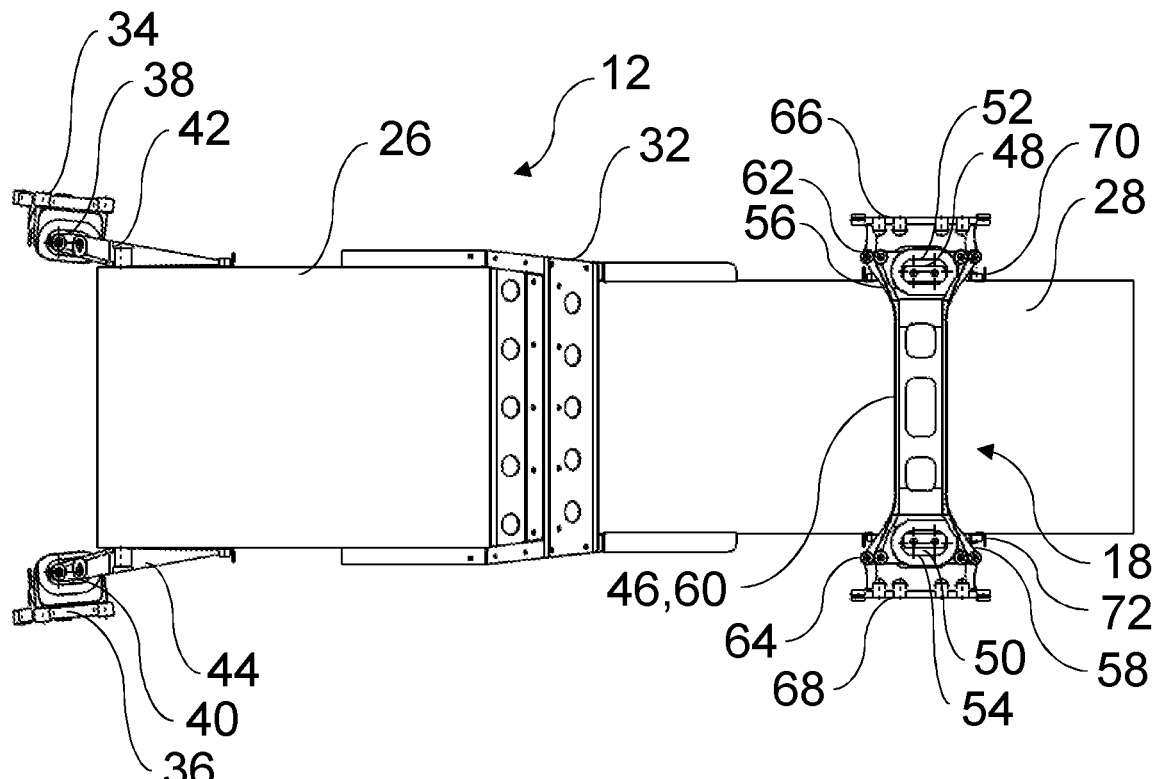
Figure 7:
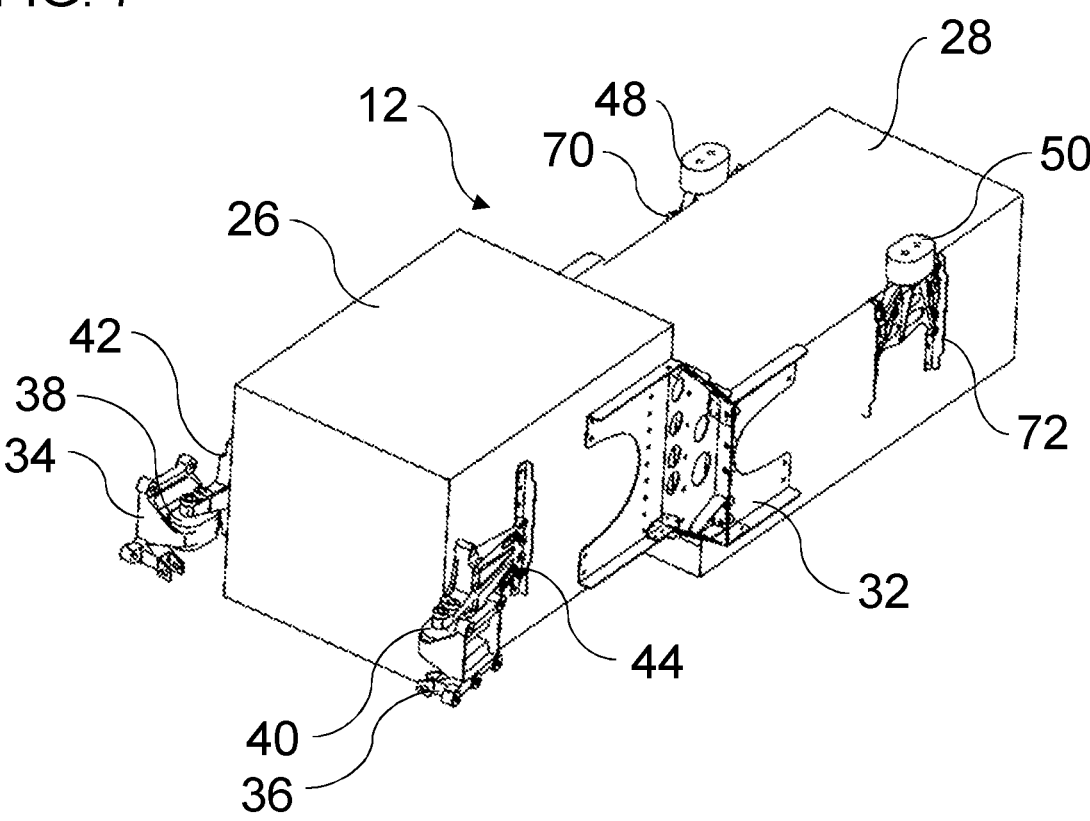
Figure 8:
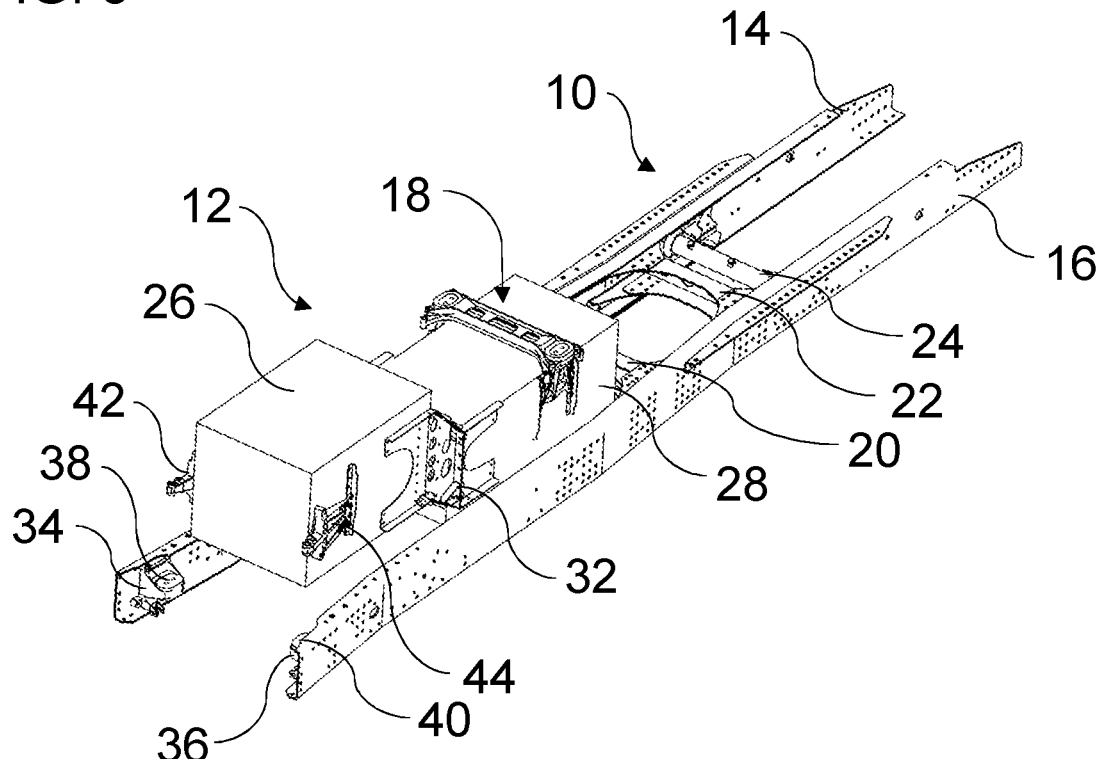

The preferred embodiments and features of the invention described above may be combined in any desired manner. Further details and advantages of the invention are described below with reference to the accompanying drawings. They show:

FIG. 1 a perspective view of a device with a ladder frame and an elastically supported assembly according to an embodiment of the present disclosure;

FIG. 2 a top view of the exemplary device of FIG. 1;

FIG. 3 a detailed view of a front support of the exemplary device of FIG. 1;

FIG. 4 a detailed view of a cross beam of the exemplary device of FIG. 1;

FIG. 5 a side view of the exemplary device, wherein the main longitudinal beams as well as several cross beams of the ladder frame are hidden or not shown;

FIG. 6 a top view of the exemplary device, wherein the main longitudinal beams and several cross beams of the ladder frame are hidden or not shown;

FIG. 7 a perspective view of the exemplary device, wherein the main longitudinal beams and the cross beams of the ladder frame are hidden or not shown; and FIG. 8 a perspective view of a mounting step in the assembly of a pre-mounting unit to a ladder frame.

The embodiments shown in the figures correspond at least in part, so that similar or identical parts are provided with the same reference signs and reference is also made to the description of the other embodiments or figures for their explanation in order to avoid repetition.

FIGS. 1 and 2 show a ladder frame 10 and an assembly 12 of a motor vehicle. The motor vehicle is preferably configured as a utility vehicle, particularly preferably as a truck or a bus.

The ladder frame 10 has two main longitudinal beams 14, 16 and a plurality of cross beams 18, 20, 22, 24. The main longitudinal beams 14, 16 are arranged in parallel spaced apart relationship. The cross beams 18, 20, 22, 24 are arranged in parallel spaced apart relationship. The cross beams 18, 20, 22, 24 each connect the two main longitudinal beams 14, 16 to each other. The plurality of cross beams 18, 20, 22, 24 may preferably be fastened to inner sides of the main longitudinal beams 14, 16.

The assembly 12 is supported on the ladder frame 10. The assembly 12 includes a traction battery (pack), for example in the form of a high-voltage energy storage. The assembly 12 may preferably include additional components, such as power electronics, an air conditioning compressor, a cooling water pump, and/or a high-voltage heater. However, it is also possible to use the techniques disclosed herein for mounting the traction battery to the ladder frame 10 to mount other assemblies to the lead frame 10. The assembly 12 supported on the ladder frame 10 may alternatively or additionally include, for example, a drive unit, a transmission, and/or a cooling system, etc.

In a preferred embodiment, the assembly 12 comprises two assembly blocks 26 and 28. It is also possible for the assembly 12 to have only one block, or more than two blocks, or no block shape at all.

The assembly blocks 26 and 28 may each have a substantially cuboid shape. Preferably, a portion of the traction battery of the assembly 12 is included in each of the two assembly blocks 26, 28.

Preferably, the assembly blocks 26 and 28 are connected to each other in a stepped manner. The first assembly block 26 can be located higher than the second assembly block 28. The first assembly block 26 can thus be arranged above a front axle 30 (indicated schematically in FIG. 1). The second assembly block 28 can be arranged at least in sections at the same level as the front axle 30.

The assembly blocks 26 and 28 can be connected to one another by means of at least one connecting beam 32, particularly preferably in a stepped manner. The connecting beam 32 can connect the assembly blocks 26 and 28 at longitudinal outer sides of the assembly blocks 26, 28. For this purpose, the connecting beam 32 may be fastened to opposite longitudinal outer sides of the first assembly block 26 and to opposite longitudinal outer sides of the second assembly block 28. Additionally or alternatively, the connection bracket 32 may connect a rear side (with respect to a forward travel direction of the motor vehicle) of the first assembly block 26 to a front side (with respect to a forward travel direction of the motor vehicle) of the second assembly block 28. For this purpose, the connecting carrier 32 may be fastened to a rear side of the assembly block 26 and to a front side of the second assembly block 28. Particularly preferably, the connecting beam 32 fastens both longitudinal outer sides and the rear side of the first assembly block 28 to both longitudinal outer sides and the front side of the second assembly block 28. Preferably, the connecting beam 32 may have an H-shape in a plan view (see, for example, FIG. 2).

Referring to FIGS. 1 to 8, it is described below how the assembly 12 is supported at the ladder frame 10.

The assembly 12 is elastically supported on the ladder frame 10. Preferably, the assembly 12 is elastically supported on the ladder frame 10 in a so-called 4-point support arrangement. Preferably, two elastic bearing points may be arranged at the front portion of the assembly 12 and/or at the first assembly block 26. Two further elastic bearing points may be arranged in the rear portion of the assembly 12 and/or on the second assembly block 28. It is also possible for the assembly 12 to be elastically supported on the ladder frame 10 at more or fewer bearing points (for example, 3-point support or 6-point support). Preferably, the elastic support of the assembly 12 can be designed for mounting in the supercritical portion (higher natural frequencies than the excitation range of the axles, adapted (optimized) operating point with regard to road-excited loads and rolling comfort).

The assembly 12, preferably the first assembly block 26 thereof, can preferably be elastically supported on the main longitudinal beams 14, 16. Fastening brackets 34, 36 may be fastened to longitudinal inner sides of the main longitudinal beams 14, 16, preferably by means of screw connections. The fastening brackets 34, 36 can each have a receptacle, preferably a through hole, in which an elastomeric bearing 38, 40 is arranged in each case. The elastomeric bearings 38, 40 can, for example, be pressed into the respective receptacle and/or screwed to the respective fastening bracket 34, 36. Fastening brackets 42, 44 may be fastened in the longitudinal outer sides of the assembly 12, preferably the first assembly block 26 thereof. The fastening brackets 42, 44 may support the assembly 12 on the elastomeric bearings 38, 40. Specifically, the first fastening bracket 42 can fasten a first longitudinal outer side of the assembly 12 to the elastomeric bearing 38 from above. The second fastening bracket 44 can fasten a second longitudinal outer side of the assembly 12, oriented opposite the first longitudinal outer side, to the elastomeric bearing 40 from above. For example, the fastening brackets 42, 44 may be bolted to the elastomeric bearings 38, 40. Particularly preferably, the fastening brackets 42, 44 are fastened to an top side of the elastomeric bearings 38, 40. Conveniently, the assembly 12 can thus be lowered onto the elastomeric bearings 38, 40 from above for assembly.

The assembly 12, preferably the second assembly block 28 thereof, is elastically supported on the cross beam 18, which is described in detail below with particular reference to FIGS. 4 to 6. The configuration of the cross beam 18 is a particular feature of the present disclosure. It is possible that the cross beam 18 may also be used in other systems as a cross beam of a ladder frame for resiliently supporting an assembly, preferably in a suspended manner.

The cross beam 18 may be configured with mirror symmetry with respect to a central vertical plane perpendicular to a longitudinal axis of the cross beam 18 (i.e. parallel to the other cross beams 20, 22, 24) and dividing the cross beam 18 into two equal halves.

The cross beam 18 has an elongated support body 46 and two elastomeric bearings 48 and 50.

The support body 46 has a top side and a bottom side. Two through holes 52, 54 connect the top and bottom sides of the support body 46. The through holes are preferably configured as elongated holes aligned along a transverse axis of the support body 46. Elastomeric bearings 48, 50 are arranged in the through holes 52, 54.

Specifically, the first elastomeric bearing 48 is arranged in the first through hole 52. The second elastomeric bearing 50 is arranged in the second through hole 54. The cross-sections of the elastomeric bearings 48, 50 and the through holes 52, 54 may correspond to each other. A respective circumferential face of the elastomeric bearings 48, 50 is preferably substantially fully circumferentially supported in the respective through hole 52, 54.

However, it is also possible for the support body 46 to have more or less than two through holes, each with an elastomeric bearing arranged therein. For example, the support body of the cross beam could have only one elastomeric bearing arranged in a through hole of the cross beam. This through hole could, for example, be arranged centrally in the support body with respect to a longitudinal axis of the support body.

Preferably, the support body 46 is configured as a solid body or with a closed profile. Preferably, the support body 46 is configured as a metal support body. The support body 46 may be configured with mirror symmetry with respect to a central vertical plane that is perpendicular to a longitudinal axis of the support body 46 and divides the support body 46 into two equal halves.

The elastomeric bearings 48, 50 are preferably press-fitted into the through holes 52, 54. Additionally or alternatively, the elastomeric bearings 48, 50 may be secured in the through holes 52, 54 by means of a screw connection. For example, elastomeric bearings 48, 50 are each covered on the top or bottom side with a fastening plate that is screwed to the respective elastomeric bearing 48, 50 and has a larger cross section than the respective through hole 52, 54.

The two through holes 52, 54 may be arranged off-center in the support body 46 with respect to a longitudinal axis of the support body 46. The through holes 52, 54 are each preferably arranged in a portion of the support body 46 that has an enlarged cross-section and/or wall thickness.

Specifically, the first through hole 52 may be arranged in a first end portion 56 of the support body 46. The second through hole 54 may be arranged in a second end portion 58 of the support body 46. The first end portion 56 may be oriented opposite the second end portion 58. The support body 46 may extend along its longitudinal axis between the first end portion 56 and the second end portion 58. The support body 46 may expand in cross-section from a middle portion 60 of the support body 46 toward the first end portion 56 and toward the second end portion 58. Expediently, the support body 46 may have a substantially I profile in a plan view, with the two transverse legs of the I profile formed by the end portions 56, 58 and the longitudinal leg formed by the middle portion 60. Preferably, the end portions 56, 58 may each have a substantially trapezoidal shape with the longer of the two parallel legs directed outwardly with respect to the longitudinal axis of the support body 46.

Alternatively or in addition to the through holes 52, 54, the end portions 56, 58 may also have fastening sections 62, 64, for example in the form of a plurality of screw slugs in each case.

Preferably, the screw slugs are aligned in a vertical direction. The fastening sections 62, 64 may be arranged on either side of the respective through holes 52, 54 with respect to a transverse axis of the support body 46. This can allow the through holes 52, 54 and thus the elastomeric bearings 48, 50 to be arranged as far out as possible with respect to the longitudinal axis of the support body 46, for example overlapping with the respective fastening sections 62, 64 as viewed in a viewing direction of the transverse axis and/or at the level of the fastening sections 62, 64.

At least one recess or recess may be arranged in the middle portion 60 of the support body 46 to save weight. The middle portion 60 may be configured to be substantially web-shaped.

Optionally, the cross beam 18 may include two fastening brackets 66, 68. The first fastening bracket 66 may be fastened to the first fastening section 62, preferably from below and/or by means of a plurality of screw connections. The second fastening bracket 68 may be fastened to the second fastening section 64, preferably from below and/or by means of a plurality of screw connections. The support body 46 preferably rests on the fastening brackets 66, 68. The fastening brackets 66, 68 are fastened to the two main longitudinal beams 14, 16, preferably internally and/or by means of screw connections. However, it is also possible for the cross beam 18 to have no fastening brackets 66, 68, but to be fastened directly to the main longitudinal beams 14, 16, for example by means of fastening sections 62, 64 correspondingly adapted thereto.

The assembly 12, preferably the second assembly block 28, is elastically supported on the elastomeric bearings 48, 50. More specifically, the assembly 12, preferably the second assembly block 28, may have a fastening bracket 70, 72 fastened to each longitudinal outer side. The fastening brackets 70, 72 may extend upwardly. The fastening brackets 70, 72 may be fastened to the elastomeric bearings 48, 50 from below. Specifically, the first fastening bracket 70 may fasten a first longitudinal outer side of the assembly 12 to the first elastomeric bearing 48 from below. The second fastening bracket 72 may fasten a second longitudinal outer side of the assembly 12, oriented opposite the first longitudinal outer side, to the second elastomeric bearing 50 from below. For example, the fastening brackets 70, 72 may be bolted to the elastomeric bearings 48, 50. Thus, the assembly 12 may be suspended from the elastomeric bearings 48, 50 by means of the fastening brackets 70, 72.

The exemplary cross beam 18 disclosed herein provides an improved method of mounting the assembly 12 to the ladder frame 10, as explained below.

Prior to mounting the assembly 12 to the ladder frame 10, the cross beam 18, preferably without the fastening brackets 66, 68, is individually pre-mounted to the assembly 12, preferably above the assembly 12. The fastening brackets 70, 72 can be fastened to the elastomeric bearings 48, 50 already mounted in the cross beam 18 for this purpose. The assembly 12 can thus form a pre-mounting unit together with the cross beam 18. The pre-mounting unit can preferably additionally comprise both assembly blocks 26, 28 as well as the fastening brackets 42 and 44 of the assembly block 26.

Before the mounting of the assembly 12 to the ladder frame 10, the ladder frame 10 is additionally pre-mounted with the main longitudinal beams 14, 16 and at least two of the plurality of cross beams 20, 22, 24. Additionally, preferably the fastening brackets 66, 68 for the cross beam 18 can be pre-mounted on longitudinal inner sides of the main longitudinal beams 14, 16. Furthermore, the fastening brackets 34, 36 with the elastomeric bearings 38, attached to them can preferably be pre-mounted on longitudinal inner sides of the main longitudinal beams 14, 16.

FIG. 8 shows an example of how the pre-mounting unit is then mounted to the pre-mounted (pre-assembled) ladder frame 10. Preferably, the pre-mounting unit can be raised for this purpose and lowered into the pre-mounted ladder frame 10 so that the fastening sections 62, 64 rest on the fastening brackets 66, 68, and the fastening brackets 42, 44 rest on the elastomeric bearings 38, 40. Once the pre-mounting unit is in contact with the fastening brackets 42, 44 and the elastomeric bearings 38, 40, the fastening sections 62, 64 can be fastened to the fastening brackets 66, 68, and the fastening brackets 42, 44 can be fastened to the elastomeric bearings 38, 40.

The invention is not limited to the preferred embodiments described above. Rather, a large number of variants and variations are possible which also make use of the inventive concept and therefore fall within the scope of protection. In particular, the invention also claims protection for the subject matter and features of the subclaims independently of the claims referenced. In particular, the individual features of independent claim 1 are each independently disclosed. Additionally, the features of the subclaims are also disclosed independently of all of the features of independent claim 1 and, for example, independently of the features relating to the presence and/or configuration of the elongated support body, the top side, the bottom side, the at least one through hole, and the at least one elastomeric bearing of independent claim 1.

LIST OF REFERENCE SIGNS

10 Ladder frame
12 Assembly
14 Main longitudinal beam
16 Main longitudinal beam
18 Cross beam
20 Cross beam
22 Cross beam
24 Cross beam
26 Assembly block
28 Assembly block
30 Front axle
32 Connecting beam
34 Fastening bracket
36 Fastening bracket
38 Elastomeric bearing
40 Elastomeric bearing
42 Fastening bracket
44 Fastening bracket
46 Elongated support body
48 Elastomeric bearing
50 Elastomeric bearing
52 Through hole
54 Through hole
56 End portion
58 End portion
60 Middle portion
62 Fastening section
64 Fastening section
66 Fastening bracket
68 Fastening bracket
70 Fastening bracket
72 Fastening bracket

The invention claimed is:

1. A cross beam for a ladder frame of a motor vehicle comprising:

an elongated support body comprising:

a top side and a bottom side; and at least one through hole connecting the top side and the bottom side;

at least one elastomeric bearing arranged in the at least one through hole and configured to elastically support an assembly on the cross beam.

2. The cross beam according to claim 1, wherein:
the at least one elastomeric bearing is press-fitted into the at least one through hole.

3. The cross beam according to claim 1, wherein:
the at least one through hole is configured as an elongated hole.

4. The cross beam according to claim 1, wherein:
the motor vehicle is a utility vehicle; and/or
the assembly includes a traction battery; and/or
the at least one elastomeric bearing is press-fitted into the at least one through hole and is additionally secured to the elongated support body by means of a screw connection; and/or
the at least one through hole is configured as an elongated hole aligned along a transverse axis of the elongated support body.

5. The cross beam according to claim 1, wherein:
the elongated support body is reinforced and/or has an increased wall thickness in a portion of the at least one through hole; and/or
the elongated support body is configured as a solid body or with a closed profile.

6. The cross beam according to claim 1, wherein:
the at least one through hole comprises a first through hole and a second through hole;
the at least one elastomeric bearing comprises a first elastomeric bearing and a second elastomeric bearing;
the first elastomeric bearing is arranged in the first through hole; and
the second elastomeric bearing is arranged in the second through hole.

7. The cross beam of claim 6, wherein:
the first elastomeric bearing and the second elastomeric bearing are arranged at outermost opposite ends of the elongated support body.

8. The cross beam according to claim 6, wherein:
the elongated support body extends from a first end portion through a middle portion to a second end portion;
the middle portion having a smaller cross-section than the first end portion and the second end portion;
the first through hole is arranged in the first end portion; and
the second through hole is arranged in the second end portion.

9. The cross beam according to claim 6, wherein:
the cross beam further comprises a first fastening bracket fastened endwise to a first fastening section of the elongated support body and configured for fastening to a first main longitudinal member of the ladder frame; and
the cross beam further comprises a second fastening bracket fastened endwise and opposite to the first fastening bracket to a second fastening section of the elongated support body and configured for fastening to a second main longitudinal member of the ladder frame.

10. The cross beam according to claim 9, wherein:
the elongated support body rests on the first fastening bracket of the cross beam and the second fastening bracket of the cross beam; and/or
the first fastening section is arranged with respect to a transverse axis of the support body on both sides of the first through hole and/or the first elastomeric bearing; and/or the second fastening section is arranged with respect to a transverse axis of the support body on both sides of the second through hole and/or the second elastomeric bearing.

11. The cross beam according to claim 9, wherein:
the first fastening section is arranged with respect to a transverse axis of the support body on both sides of the first through hole and/or the first elastomeric bearing overlappingly viewed in a direction of the transverse axis; and/or
the second fastening section is arranged with respect to a transverse axis of the support body on both sides of the second through hole and/or the second elastomeric bearing overlappingly viewed in a direction of the transverse axis.

12. A motor vehicle comprising:
a ladder frame having two parallel main longitudinal beams and a cross beam according to claim 1, the cross beam being fastened between the two parallel main longitudinal beams; and
an assembly supported resiliently and suspended from the at least one elastomeric bearing of the cross beam.

13. The motor vehicle according to claim 12, wherein:
the assembly comprises a traction battery, power electronics, an air conditioning compressor, a cooling water pump, and/or a high voltage heater.

14. The motor vehicle according to claim 12, wherein:
two opposite longitudinal outer sides of the assembly each comprise a fastening bracket, each fastening the assembly to one of the elastomeric bearings of the cross beam; and/or
the assembly is additionally elastically supported on the two parallel main longitudinal beams.

15. The motor vehicle according to claim 12, wherein:
the assembly comprises a first assembly block and a second assembly block connected to each other in a stepped manner, the first assembly block being located higher than the second assembly block;
the first assembly block is arranged above a front axle of the motor vehicle; and
the second assembly block is arranged at least in sections on a level with the front axle.

16. The motor vehicle according to claim 12, wherein:
the motor vehicle is a utility vehicle; or
the assembly is additionally elastically supported on the two parallel main longitudinal beams, resting on and/or forming an elastic 4-point support of the assembly on the ladder frame.

17. A method for mounting an assembly to a ladder frame of a motor vehicle comprising:
providing a cross beam according to claim 1;
pre-mounting the cross beam to the assembly by means of the at least one elastomeric bearing of the cross beam to form a pre-mounting unit; and
mounting the pre-assembly unit to the ladder frame.

18. The method according to claim 17, wherein:
the assembly includes a traction battery; and/or
the motor vehicle is a utility vehicle; and/or
the cross beam is above the assembly to form the pre-mounting unit.

19. The method according to claim 17, wherein mounting the pre-assembly unit to the ladder frame comprises:
lowering the pre-mounting unit between two parallel main longitudinal beams of the ladder frame until the elongated support body of the cross beam rests on fastening brackets fastened internally to the two parallel main longitudinal beams; and fastening the elongated support body to the fastening brackets fastened internally to the two parallel main longitudinal beams.

* * * * *